Figure 1:
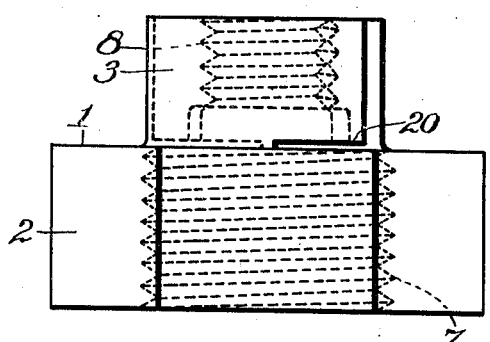

Oct. 19, 1926.

D. T. BROWNLEE

GRIPPING LOCK NUT

Filed Nov. 9, 1925

1,603,901

INVENTOR:
Dalmar T. Brownlee,
BY
E. T. Silvius,
ATTORNEY.

Patented Oct. 19, 1926.

1,603,901

UNITED STATES PATENT OFFICE.

DALMAR T. BROWNLEE, OF INDIANAPOLIS, INDIANA.

GRIPPING LOCK NUT.

Application filed November 9, 1925. Serial No. 67,970.

This invention relates to screw-threaded nuts suitable, among other instances, for use on machinery bolts where locking means are required to prevent the nuts from becoming unscrewed or loosened on the bolts.

The invention aims to provide a nut of unitary construction, and at low cost of manufacture, having non-failing means for automatically locking the nut when screwed into place.

A further and more specific object of the invention is to provide an improved screw-threaded nut that shall automatically and unfailingly cut and bite into a bolt immediately upon unscrewing movement of the nut or the bolt, thus to lock the parts against relatively unscrewing movements.

In one-piece locking nuts heretofore made, gripping teeth have been improvised by transversely slotting one end of the nut and pinching inward at the extreme end the rearward corners of the threaded segments so formed. In use such nuts have proven unreliable, for the reason that when so constructed there is not a sufficient clearance angle between the bolt threads and the segment threads to make dependable cutting teeth of the ends of the latter. In steel cutting lathe tools, for instance, it has been found that a clearance angle of ten degrees is required for the tool to readily cut into the work, and similarly, a like clearance angle for the teeth of a lock-nut is found to be necessary to effective cutting or biting of the locking teeth into the bolt threads. When such a nut as heretofore made is screwed onto a bolt, the pinched-in portions of the segments are gradually forced back to their initial positions while the other portions of the segments are affected only slightly if at all, and consequently little or no clearance angle exists between the segment threads and the bolt threads; therefore, in practice the gripping teeth of such nuts usually fail to bite or dig in and their resistance to unscrewing depends upon friction alone and is of slight practical valve. To overcome this difficulty, others have used bolts provided with a number of grooves transversely of the threads for the gripping teeth to catch into, but such bolts are objectionable and are not practical commercially.

In the present invention the locking teeth are formed on threaded segments of fingers recessed adjacent to the nut body and forming a somewhat elastic portion, thereby permitting the threaded portion of the finger to be twisted, relatively to the nut body moving the rearward biting end inward within and the forward end outward of the thread segments beyond the inherent thread circle sufficiently so that the segment threads form an ample clearance angle with the bolt threads, insuring the digging in of the locking teeth on reverse motion.

With the above-mentioned and other objects in view, the invention consists in a self-locking nut having novel locking teeth adapted to automatically cut or dig into the bolt threads upon slight reverse or unscrewing movements of either the nut or the bolt on which the nut may be used, and to stop further reverse movements, the invention consisting also further in the parts and combinations and arrangements thereof as hereinafter particularly described and claimed.

Figure 2:
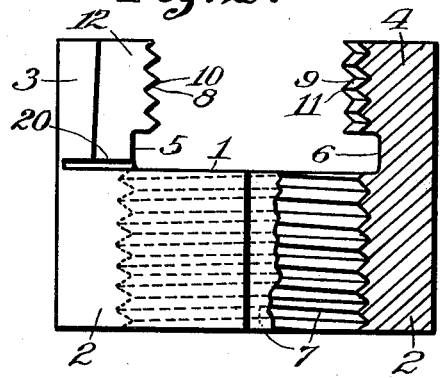
Figure 3:
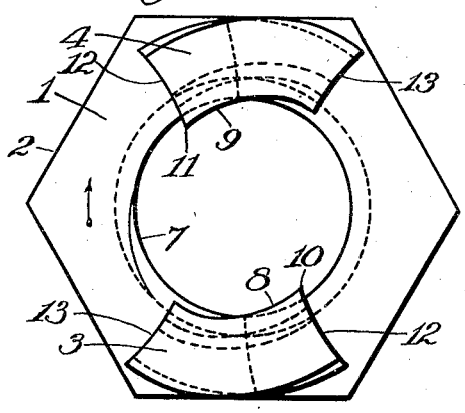
Figure 5:
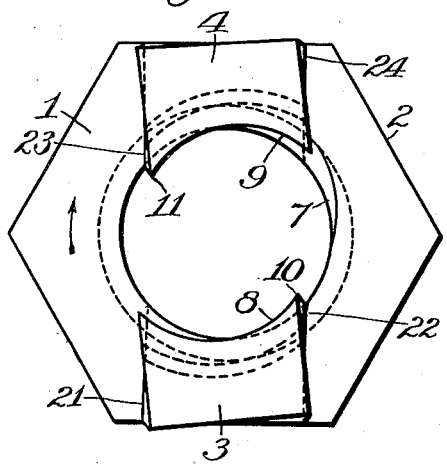
Figure 4:
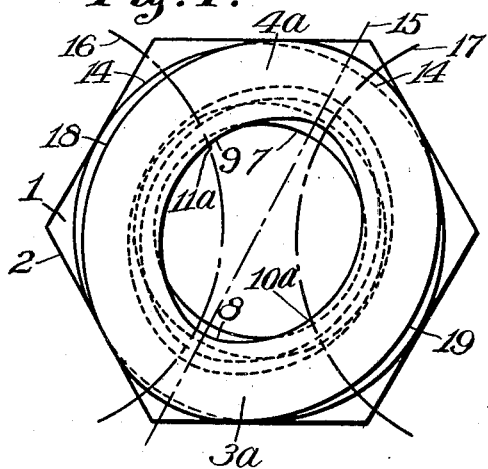
Figure 6:
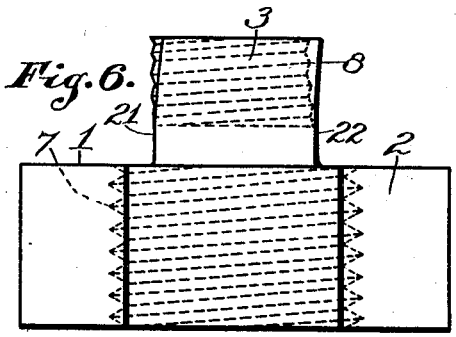

Referring to the drawings,—Figure 1 is an elevation showing the construction of the improved nut as made by one method of manufacture; Fig. 2 is an elevation at right angles to that in the preceding figure and partially in central section; Fig. 3 is a top plan of the same nut; Fig. 4 is a top plan of the same lock-nut partially completed, as explanatory of one method of production thereof; Fig. 5 is a top plan of the lock-nut as made by another method of manufacture; Fig. 6 is an elevation of the nut shown in Fig. 5.

Similar reference characters in the different figures of the drawings indicate corresponding elements or features of the improved lock-nut hereinafter referred to in detail.

A practical embodiment of the invention comprises a nut body 1 which may have the conventional or any special contour, a hexagonal form having relatively annular side faces 2 being shown. The body obviously has a central opening therein, and the top or one end of the body has preferably two projections or locking fingers 3 and 4 integral therewith and on opposite sides of the opening, alike in shape but reversely arranged. The illustrations indicate a right-hand nut to be screwed onto a bolt in the direction indicated by the arrows on Figs. 3 and 5. The projections are integral with the body and left thereon when other portions of the body are cut away. The inner or opposite sides of the projections have recesses 5 and 6 adjacent to the top end of the body to render the projections slightly elastic and to permit them to be readily twisted. The nut body has suitable screw threads 7 therein and the projections have screw thread segments or thread parts 8 and 9 preferably cut as an operation continuous with the cutting of the threads 7, but made non-continuous by the recesses 5 and 6, and so that they shall follow the bolt threads on which the threads 7 may be screwed. After the screw threads are cut the projections or fingers are twisted on their longitudinal axes so that the terminal or "tail" ends of the thread segments 8 and 9 shall project abruptly inward, and constitute teeth 10 and 11 adapted to dig into the bolt threads with which the lock-nut may be coacting on reverse movement of the lock-nut, the opposite ends of the thread segments being carried outward from their initial positions so as to form an ample clearance angle between the threads of the segments and the bolt threads enabling the teeth 10 and 11 to readily dig in. The end 12 of each projection or locking finger may be concave, this being the rearward end as the lock-nut is screwed onto a bolt, so as to conveniently contribute to the production of sharpened points on the teeth 10 and 11, the opposite or forward ends 13 of the projections also being concave.

In the lock-nut as shown in Figs. 1, 2, 3 and 4, the twisting of the threaded segments is brought about by having the upper portion 14 of the nut initially of circular contour, pressing the same into an eliptical contour and, at a suitable relation to 15, the major axis of the elliptical portion, and along the lines 16 and 17, cutting away the portions 18 and 19, the portions 3ᵃ and 4ᵃ remaining with the nut body as twisted threaded segments.

In some cases a slit 20 may be cut crosswise of each finger 3 and 4 close to the end of the body and through a portion of the bottom of the recess.

In the lock-nut as shown in Figs. 5 and 6, two projections 3 and 4 stand upon the nut body, one projection having parallel sides 21 and 22, the other projection having parallel sides 23 and 24, initially the sides 21 and 23 being on one and the same plane and the opposite sides 22 and 24 on a relatively parallel plane, after which the projections are twisted on their longitudinal axes so as to appear as in Fig. 5, the rearward portions of the thread segments 8 and 9 being curved inwardly beyond the circle described by the tops of the screw thread 7 to constitute the teeth 10 and 11, the forward or leading portions of the thread segments extending outward from said circle, the thread segments retaining their inherent curvature.

By the construction of the nut in connection with the recesses 5 and 6 the threaded portions of the fingers 3 and 4 may be radically displaced with reference to the body thread, thereby obtaining a high pressure on the points of the teeth 10 and 11 and ample cutting clearance angle which is essential for non-failing locking.

The material of which the lock-nuts are composed is sufficiently hard for the purpose of the invention, such as iron subsequently case hardened, or a suitable quality of steel.

In practical use the lock-nut is screwed onto a bolt as is customary, the nut body usually turning easily without the use of a wrench, and when the projections or fingers 3 and 4 come in contact with the bolt a wrench should be used to force the lock-nut further onto the bolt, the teeth 10 and 11 hugging the bolt threads and causing some frictional resistance, until the nut has been turned to the required position. In case the nut is inclined to unscrew on the bolt, due to vibration or movement of the parts held by the bolt, the locking teeth immediately bite or dig into the threads of the bolt and prevent unscrewing; but the lock-nut may be unscrewed on application of considerable force by means of a wrench, and may be repeatedly used.

What is claimed as new is:

1. A lock-nut having continuous screw threads and also thread segments, each segment having one end arranged inside the inherent curve of the continuous threads to constitute a tooth, the opposite end of the segment being arranged outside of and clear of the curve to afford a cutting tooth clearance angle permitting the tooth to dig into a bolt when in the lock-nut.

2. A screw-threaded lock-nut body and opposite toothed fingers on one end of the body, each finger having a recess in the inner side thereof adjacent to the end of the body and having also a slit cut cross-wise of the finger close to the end of the body and through a portion of the bottom of the recess, the remaining portion of each finger adjacent to the slit and the end of the body being rotatively twisted relatively to the nut-lock body.

3. A lock-nut body having a slightly elastic longitudinal locking finger on one end thereof, there being a continuous screw thread in the body, the finger having a spirally twisted contour and having also screw thread segments on the inner side thereof extending materially across the inherent curve of the top of the continuous screw thread and constituting a cutting tooth and a clearance angle for the tooth.

4. A lock-nut body having a longitudinal locking finger on one end thereof, there being a continuous screw thread in the body, the finger having a recess in the inner side thereof and a spirally twisted contour adjacent to the recess, the finger having also a screw thread segment on the inner side of the twisted portion thereof constituting a cutting tooth at one end of the segment, the opposite end of the segment being disposed outside the inherent circle of the top of the continuous screw thread.

5. A lock-nut body and opposite locking fingers on one end of the body, there being a continuous screw thread in the body, each finger having a recess in the inner side thereof adjacent to the body and having also screw thread segments between the recess and the end of the finger, each thread segment extending across the inherent curve of the continuous screw threads and having one end disposed inside of said curve to constitute a cutting tooth, the segment having an opposite end disposed outside said curve and affording a cutting tooth clearance angle permitting the tooth to dig into a bolt when in the nut.

6. A lock-nut having improved structure characterized by spirally twisted locking fingers on one end of a screw-threaded nut, each finger having on its inner side a screw thread segment longitudinally curved symmetrically and disposed to materially cross the inherent curve of the thread in the nut to constitute a cutting tooth having a clearance angle extending outward beyond said curve.

In testimony whereof, I affix my signature on the 4th day of November, 1925.

DALMAR T. BROWNLEE.